Aug. 14, 1928.

F. H. BECKER 1,681,087

BALL BEARING CENTER FOR MACHINES

Filed April 21, 1927

INVENTOR
Fritz Heinrich Becker
BY
ATTORNEY

Patented Aug. 14, 1928.

1,681,087

UNITED STATES PATENT OFFICE.

FRITZ HEINRICH BECKER, OF IRVINGTON, NEW JERSEY.

BALL-BEARING CENTER FOR MACHINES.

Application filed April 21, 1927. Serial No. 185,638.

This invention relates to a new and useful device in the nature of a machine tool center particularly adapted for use in connection with machine tools, i. e., lathes, grinders, and the like, for the purpose of providing a dead or tail stock center.

The object of the invention is to provide a machine tool center comprising a freely moving center as a means of eliminating wear and replacement.

A further object of the invention is to provide a machine tool center of novel construction and arrangement of parts hereinafter more fully described, claimed and illustrated in the accompanying drawing.

Figure 1:
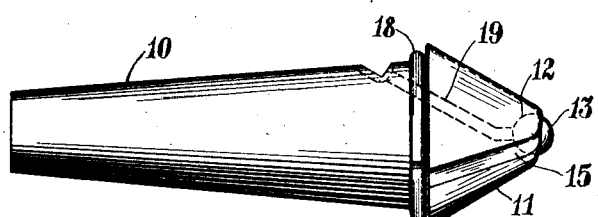
Fig. 1 is a fragmentary side elevational view of my improved machine tool center.
Figure 2:
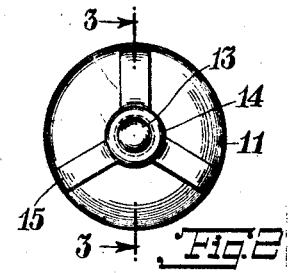
Fig. 2 is a front elevational view thereof.
Figure 3:
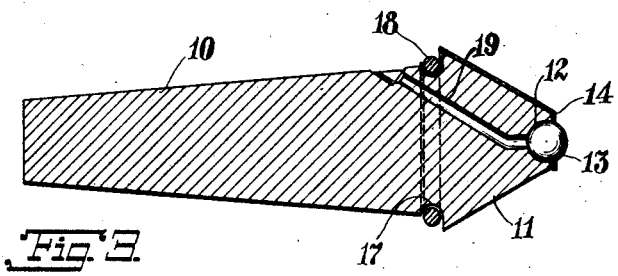
Fig. 3 is a fragmentary central sectional view thereof.
Figure 4:
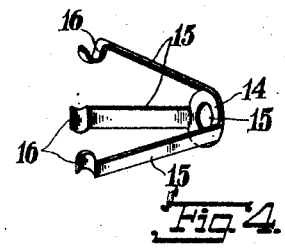
Fig. 4 is a perspective detail view of the supporting member as embodied therein.

As here embodied my improved device comprises a center proper having a tapered body element 10 adapted to engage in a tail stock of a machine tool not shown in the accompanying drawing. The said tail stock is provided with the usual means of manipulating the center proper. The center proper is bluntly pointed as at 11 and is provided in its end with a concaved seat 12, a ball 13 being freely rotatable in the seat.

The supporting member 14 is provided with an axial aperture 15 adapted to engage the ball 13 far enough on the periphery of the ball so as to hold the ball rotatably in the seat 12. The supporting member 14 is provided with extended elements 15 angularly attached thereto adapted to form contact with the surface of the bluntly pointed portion 11. The extended elements 15 are provided with inwardly curved extremities 16 adapted to engage in the co-axial groove 17 of the tapered body element 10 positioned adjacent to the bluntly pointed portion 11. The supporting member 14 is constructed of spring steel or the like, so as to permit the extremities 16 to be urged inwardly as a means of holding the supporting member 14 in place, as a means of holding the ball 13 on the seat 12. The clip 18 or clamping member, preferably of spring steel wire or the like, is formed or bent ring shaped and is positioned in the groove 17 over the extremities 16 of the supporting member 14 so as to securely hold the supporting member 14 in place. An aperture 19 is formed in the center proper and leads to the seat 12 so that a suitable lubricant for the ball 13 may be introduced into the seat 12.

The above described construction is such as will permit the ball 13 when engaged in the center mark of the work to support the said work antifrictionally, the ball 13 rotating with the said work.

Figure 5:
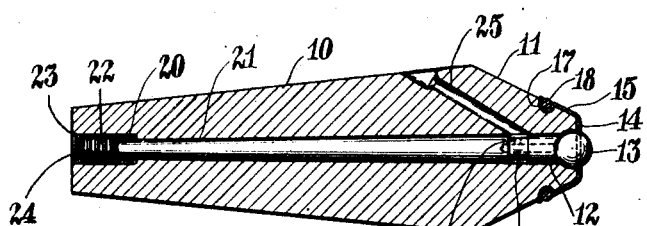
Fig. 5 is a similar view to that shown in in Fig. 1 illustrating a modification of my improved device.

In Fig. 5 of the accompanying drawing I have shown the center proper having an axial aperture provided with a threaded portion 20. The rod 21 is adapted to slidably engage in the said aperture and is provided with a threaded element 22 adapted to engage the threaded portion 20 of the said aperture. The forward extremity of the rod 21 is provided with the concave seat 12. The rod 21 is provided with a head 23 provided with a transverse slot 24. The above described construction is such as will permit the seat 12 of the rod 21 to be adjusted or extended so as to hold the ball 13 in the proper position in event of wear due to continued use of my improved device. The aperture 25 is formed in the center proper intercommunicative with the annular groove 26 formed on the periphery of the rod 21. The radial aperture 27, formed in the rod 21 is intercommunicative with the groove 26 and the axial aperture 28 which leads to the seat 12. The latter described construction is such as will permit suitable lubricant to be introduced for the ball 13 into the seat 12.

Figure 7:
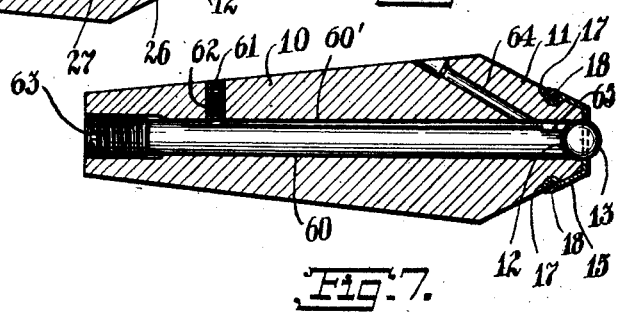
Fig. 7 is a further modification of the device.

In Figure 7 of the accompanying drawing, I have shown the rod 60, slidably mounted in an axial aperture formed in the body element 10. The set screw 61, is threadedly mounted in the body element 10, and is provided with an extended extremity 62, adapted to engage the rod 60. The screw 63, is threadedly mounted in the body element 10, and is adapted to engage the end of the rod 60, so as to hold the said rod in any desired position as may be required to secure the required position of the ball 13. The aperture 64 is formed in the center proper intercommunicative with the axial groove 65, which leads to the seat 12, for the purpose of eliminating the ball 13.

Figure 6:
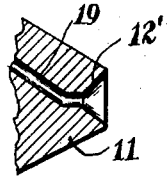
Fig. 6 is a modification of the ball seat.

In Fig. 6 of the ball seat 12' is shown to be of conical shape.

Having thus described my invention what I claim as new and desire to protect by Letters Patent of the United States is as follows:

1. A machine tool center of the class described comprising a tapered rear section and a tapered forward section, a concave seat formed in the forward extremity of said forward section, a ball disposed on said concave seat, a retaining member comprising a disc having an aperture therein for receiving said ball mounted on the forward extremity of said center adapted to retain said ball on said seat in projecting relation to the extremity of said center, extensions integral with said disc disposed adjacent the tapered surface of said forward section comprising hooked extremities disposed in a groove formed in said center, and a spring ring member disposed in said groove above said hooked extremities for removably securing said retaining member on said center.

2. A machine tool center of the class described comprising a rod having an axial aperture therethrough, an adjustable rod mounted in said aperture comprising a concave forward extremity adapted to provide a seat, a ball disposed in the forward end of said axial aperture and retained in projected relation to the end of said center by engagement with the seat formed in the end of said adjustable rod, a retaining ring disposed around the circumference of said ball, and extensions on said ring comprising hooked extremities mounted in a groove formed in said center for securing said retaining ring adjacent the forward extremity of said center.

3. A lathe center of the class described having an axial aperture therethrough, a rod adjustably mounted in said aperture comprising a concaved extremity adapted to provide a ball bearing seat, a ball bearing disposed in the forward extremity of said aperture and engaged against the concaved extremity of said rod, said rod being adapted to be adjustably positioned for predetermining the extension of said ball beyond the forward end of said center, a removable retaining ring disposed around said ball, and extensions on said ring having hooked extremities disposed in a groove in said center for retaining said ring adjacent the forward extremity of said center, said ring being adapted to limit the extension of said ball.

In testimony whereof I have affixed my signature.

FRITZ HEINR. BECKER.